Feb. 27, 1940.   J. A. GREGOIRE   2,192,075
MOTOR VEHICLE AND ITS MANUFACTURE
Filed July 30, 1936   3 Sheets-Sheet 2
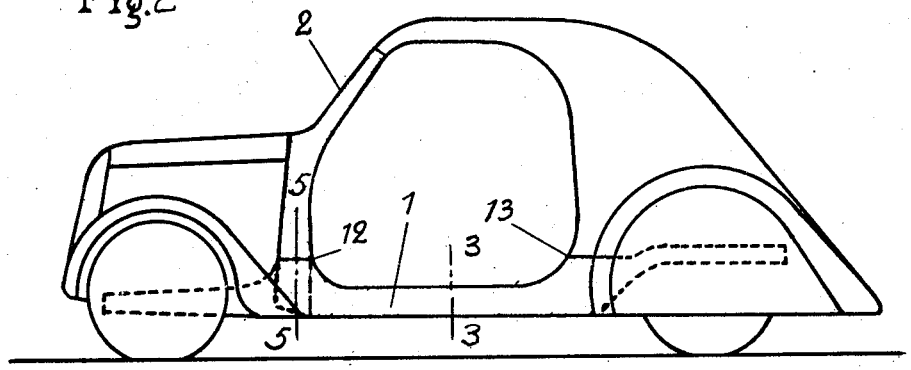
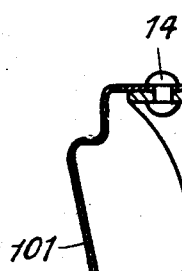
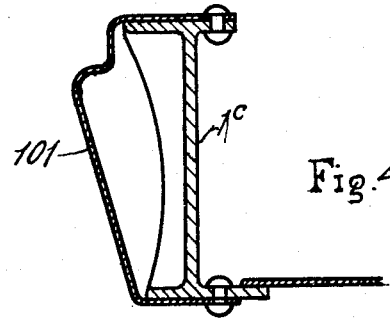
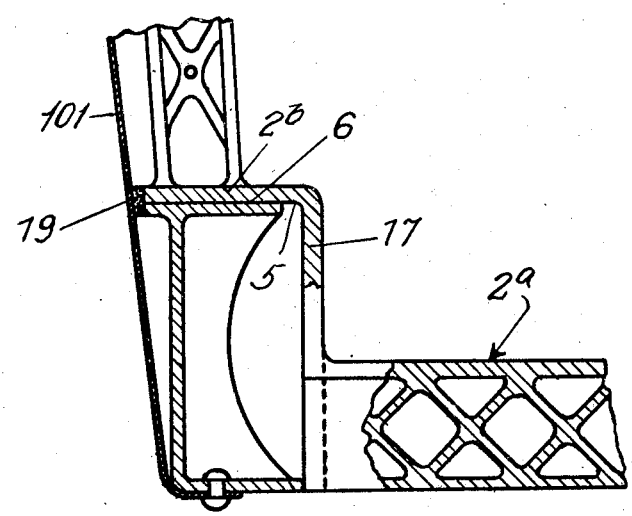
Inventor
Jean A. Gregoire
By Browne Phelps
Attorneys Feb. 27, 1940.   J. A. GREGOIRE   2,192,075
MOTOR VEHICLE AND ITS MANUFACTURE
Filed July 30, 1936   3 Sheets-Sheet 3
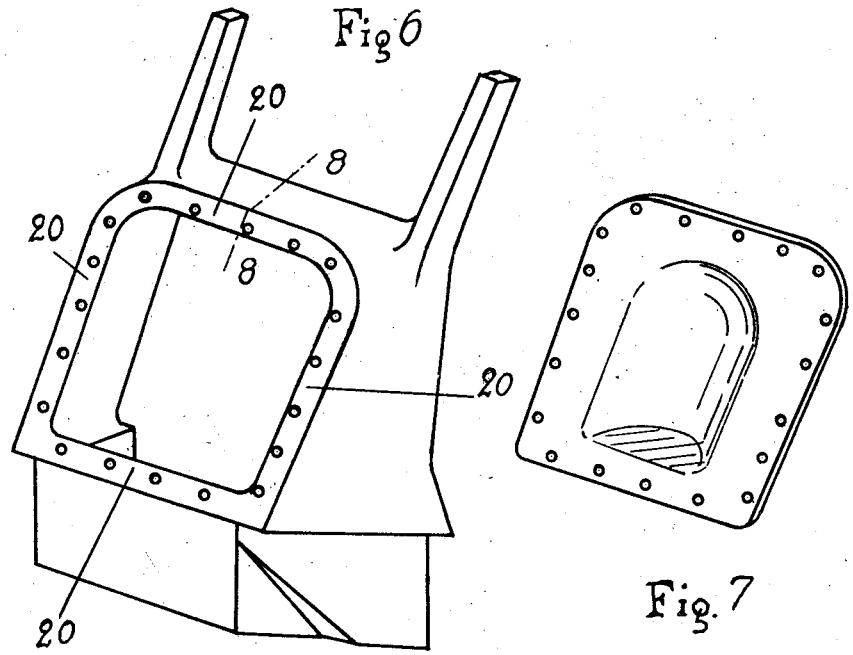
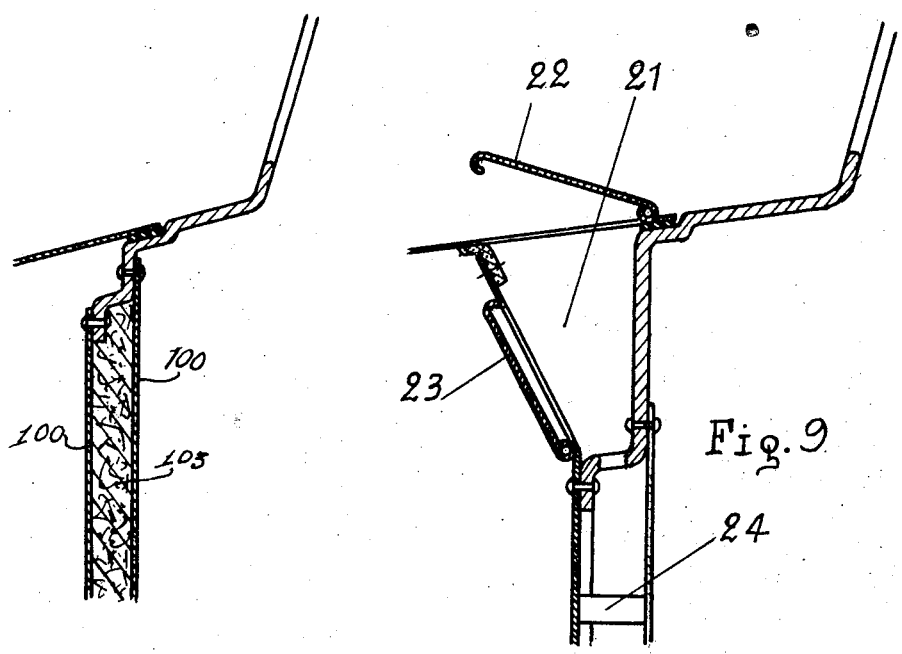
Inventor
Jean A. Gregoire
By Browne Phelps
Attorneys Patented Feb. 27, 1940

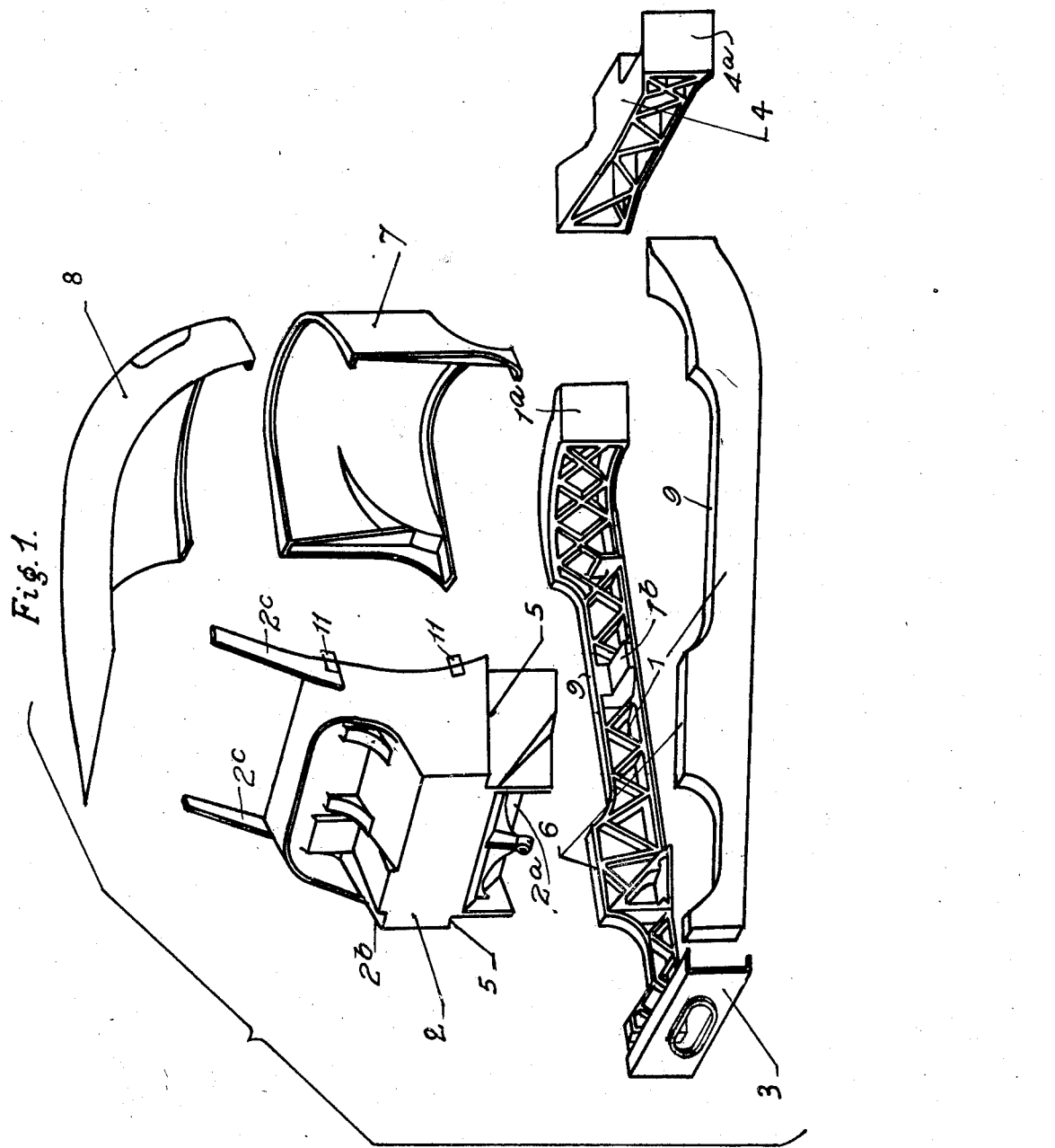

2,192,075

UNITED STATES PATENT OFFICE 2,192,075

MOTOR VEHICLE AND ITS MANUFACTURE

Jean Albert Gregoire, Paris, France

Application July 30, 1936, Serial No. 93,484
In France August 1, 1935

3 Claims. (Cl. 296—28)

The object of the present invention is to provide improvements to the manufacture of automobile vehicles.

It is known that these vehicles may be made in two different ways. The first consists in providing a separate chassis-frame on which is secured a bodywork made separately. The other method consists in forming the chassis frame and the bodywork in a single unit, generally made of welded steel. This system has, over the first one, the advantage of doing away with the superposition of two frames, that of the chassis and that of the bodywork, of reducing the weight of the whole and of giving a structure which is more rigid so that the vehicle better holds the road.

On the other hand, the manufacture of such units, including the chassis frame and the bodywork requires expensive machinery, and, when such units, as a consequence of an accident, undergo a deformation, it is very difficult and very expensive to repair them.

Furthermore, it is necessary to provide, for mounting at the desired places various mechanical parts and accessories, reinforcement pieces which it is necessary to fix to the chassis-bodywork unit after its manufacture.

The essential object of the present invention is to obviate these various drawbacks and to permit the manufacture of light cars of cheap manufacture which require but little machinery and which can easily be repaired without high costs.

Preferred embodiments of the present invention will be hereinafter described with reference to the accompanying drawings, given merely by way of example, and in which:

Fig. 1 is a perspective expanded view of the three chief parts of a unit according to the present invention;

Fig. 2 is an elevational view showing the parts of the unit that are visible in the finished vehicle;

Figs. 3 and 5 are sectional views on an enlarged scale of different embodiments of details of the invention on corresponding section lines on Fig. 2;

Fig. 4 is a section on line 3—3 showing an alternative form;

Fig. 6 is a separate perspective view of a modification of the dashboard unit;

Fig. 7 shows a detail perspective view of a plate to be applied to the aperture of Fig. 6;

Figs. 8 and 9 are sectional views of details of modification of the construction according to the present invention taken on a line corresponding to 8—8, Fig. 6.

The essential feature of the present invention consists in the provision of a structure which will be hereinafter referred to as the carcass and which is made of a certain number of cast pieces of light metal (preferably an aluminium alloy).

As shown by Fig. 1, the carcass consists of three main parts, to wit:

Two side members or longerons, called side panels 1, which replace the side members of an ordinary chassis-frame and the external shape of which is that of the lower part of the bodywork; and A dashboard 2, the lower part 2a of which forms a cross member for interconnecting the side panels, the intermediate part 2b of which constitutes the dashboard proper, and the upper part 2c of which forms a kind of hood and uprights for the windshield.

The two side panels 1 are assembled together by the dashboard unit 2 just above described, and by cross members made either of sheet metal as the front cross member 3 or of cast metal as the rear cross member 4.

The carcass above referred to consists in the embodiment shown in the drawings, of the combination of the two side panels 1 the dashboard unit 2 and the rear cross member 4, the faces 5 of the dashboard unit 2 contacting the faces 6 of the respective side panels 1, and the faces 4a of cross member 4 fitting against the inner faces 1a of the respective side panels 1.

The combined dashboard and cross member unit comprises the principal, and in small cars, the only necessary, intermediate chassis cross member.

This carcass replaces the usual chassis-frame and also incorporates a portion of the bodywork. The whole, which is exeremely rigid permits of considerably reducing the weight of the vehicle.

On this carcass are fixed, on the one hand the mechanical parts (engine driving front axle, since the vehicle shown by way of example in the drawings is of the front drive type, etc.) and, on the other hand the elements of the bodywork, such as rear portion 7, roof 8, mudguards, hood, etc. The rear portion of the bodywork and some other elements thereof may be made of cast metal.

Such a carcass of course, can be made of increased thickness at suitable points for permitting the mounting of all mechanical parts exerting stresses on their supports and which in the all-steel construction, require sheet-iron reinforcements. (See for instance, thicker portions 1b and bosses 11.)

The door not shown is fixed through its hinges to bosses 11 cast integral with the carcass dashboard unit. The portions 9 of side panels 1 conform to the shape of the lower part of the door.

In some cases, it may be advantageous to make the side of the bodywork of a single stamped metal sheet. In such an embodiment, this sheet may cover the whole of the part of the carcass that is generally visible. This arrangement permits of dispensing with any junction line such as 12 and 13 (Fig. 2) so that the only surface to be painted is a continuous sheet iron surface. In the case in which the carcass is partly visible, it is necessary to polish the cast surfaces and to cover them with special coating products.

An arrangement embodying a single stamped sheet outer covering for the carcass can be carried out as shown by Figs. 3, 4 and 5.

Figs. 3 and 4 are sectional views across the middle part of the door, corresponding to two different embodiments, respectively.

In the embodiment of Fig. 3, the general shape of the cross section of panel 1b is symmetrical with respect to that of the longerons generally employed for making steel chassis-frame, or with that of the side panels shown in Fig. 1. In other words, this cross section is that of a U lying horizontally, with its concave part turned outwardly. The outer side of the side panel is closed by the iron sheet 101, which is riveted or screwed from place to place thereon. In the drawings, the fixation is shown as obtained by means of rivets at 14 and of screws at 15.

The arrangement of Fig. 4 is substantially similar, but in this case the shape of the side panel 1c is slightly different so as to facilitate the riveting of the outer sheet 101.

Fig. 5 is a section of an embodiment including a covering plate, this view being a section on a line corresponding to line 5—5 of Fig. 2. The section of a side panel is shown at 1, and that of the end of the dashboard at 2b. The contacting faces 5 and 6 of the dashboard unit and the side panels respectively are also visible in this figure. Reference character 2a represents the lower portion of the dashboard unit acting as cross member. The iron sheet 101 is riveted to the lower part of the side panel 1. It bears upon a band 19 of a material interposed between said sheet, on the one hand, and the side panel and the dashboard unit on the other hand, said band being intended to deaden noise.

The dashboard unit 2 may be given a form slightly different from that shown by Fig. 1.

Light metal is relatively expensive. Therefore it is advantageous to reduce its weight as much as possible. The dashboard as shown by Fig. 1 is cast in a single unit. Now the whole of the central part of this unit is not visible from the outside and it can be relatively light. According to the embodiment of the present invention all this central part is replaced by a thin steel sheet riveted to the dashboard.

The dashboard unit shown by Fig. 6 is a piece the external shape of which is that of an ordinary dashboard unit. The uprights for the windshield are cast integral with the remainder of the unit.

All the central part of this dashboard unit is hollowed out, with a flange 20 provided along its periphery. On this flange is riveted an iron sheet as shown separately by Fig. 7.

This sheet is riveted along its whole periphery and the unit as thus obtained is extremely strong and light and its cost is very low.

This arrangement permits of perfectly insulating, from the point of view of noise and heat, the inside of the bodywork and the inside of the hood. It suffices, for this purpose, to provide a flange such that it is possible to fix thereon two parallel iron sheets instead of a single one. These two sheets are at a distance of from 8 to 15 mms. from each other. Fig. 8 shows a section of such an arrangement, on the line 8—8 of Fig. 6, the iron sheets being designated by 100, and an insulating material 103 being packed between these two sheets.

I may also, according to the present invention, circulate air between these two iron sheets, either fresh air or hot air.

Fig. 9 is a section on the line 8—8 of Fig. 6 of such a modification. The dashboard unit is provided at its upper part with a recess case integral therewith. This recess can communicate either with the atmosphere, by opening shutters 22 or with the hot air inside the hood by opening shutters 23. A draught device, operative by the displacement of the car, is provided at the lower part of the dashboard unit.

When shutter 22 is open and shutter 23 is closed, this draught corresponds to a flow of air from the outside. Therefore the front part of the bodywork is cooled.

When shutter 22 is closed and shutter 23 is open, a stream of hot air circulates. Therefore the front part of the bodywork is heated.

When both of the shutters are closed, the mass of air present between the two iron sheets forms an insulating cushion.

In the case of such an air circulation system pads 24 are provided from place to place between these two sheets so as to avoid any vibration.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

I claim:

1. A structure for use in an automobile vehicle comprising, in combination: two side members forming portions of the chassis frame and of the outside of the vehicle body and each formed with horizontal and vertical bearing surfaces intermediate the length thereof, said vertical surfaces facing inwardly of the frame in opposition to each other, a cross member constituting the main intermediate cross connection between said side members and also constituting the dashboard of the vehicle and a portion of the outside of the body, said cross member formed at its opposite sides, transversely of the vehicle, with shoulders providing horizontal and vertical surfaces to contact the first named horizontal and vertical bearing surfaces respectively, with the outside of the cross member flush with the outside surfaces of said members; whereby appropriate bolting of said bearing surfaces into contact will provide lateral and vertical stability to the frame.

2. A structure for use in an automobile vehicle, which comprises, in combination, two cast side members made of a light metal, a cast unit also made of a light metal, including, on the one hand, a cross member which constitutes the main intermediate cross connection between said side members, rigidly fixed thereto, and on the other hand the dashboard, and at least another cross member interconnecting said side members, each of these parts being shaped to form a portion of the chassis frame and a portion of the bodywork of said vehicle.

3. The structure of claim 2, with sheet metal covering outside surfaces of said structure.

JEAN ALBERT GREGOIRE.